United States Patent [19]

Albarino et al.

[11] 4,073,974
[45] Feb. 14, 1978

[54] COATING CONTINUOUS FILAMENTS

[75] Inventors: Robert Vincent Albarino, Summit; Sergio Torza, Madison, both of N.J.

[73] Assignee: Bell Telephone Laboratories, Incorporated, Murray Hill, N.J.

[21] Appl. No.: 600,280

[22] Filed: July 31, 1975

[51] Int. Cl.² .......................... B05D 1/18; B05D 7/20
[52] U.S. Cl. .................................... 427/163; 427/294; 427/434 E
[58] Field of Search ................. 427/163, 169, 434 E, 427/294; 118/401, 405

[56] References Cited

U.S. PATENT DOCUMENTS

| 1,454,224 | 5/1923 | Schmidt | 427/434 |
|---|---|---|---|
| 2,291,720 | 8/1942 | Hukle | 118/405 |
| 2,456,650 | 12/1948 | Ryan | 427/434 |
| 2,867,891 | 1/1959 | Horton et al. | 427/434 |
| 3,042,570 | 7/1962 | Bradt | 427/434 |
| 3,170,968 | 2/1965 | Rokonoke | 427/434 |
| 3,474,756 | 10/1969 | Van Dijk | 118/405 |
| 3,681,185 | 8/1972 | Crelb | 427/434 |
| 3,930,103 | 12/1975 | Chimura et al. | 427/163 |
| 3,960,530 | 6/1976 | Iyengar | 427/199 |

Primary Examiner—James R. Hoffman
Attorney, Agent, or Firm—Peter V. D. Wilde

[57] ABSTRACT

In conventional processes for coating continuous filaments the filament is handled by various mechanical means such as, rollers, pulleys, etc. In the manufacture of, for example, optical fibers, such handling causes unacceptable mechanical damage to the fiber. Mechanical contact of the fiber being manufactured can be avoided by passing the fiber through a capillary wetted with a curable coating liquid. The flow of the coating liquid through the capillary is limited by reducing the pressure of the ambient above the liquid level within the vessel containing the coating liquid.

8 Claims, 13 Drawing Figures

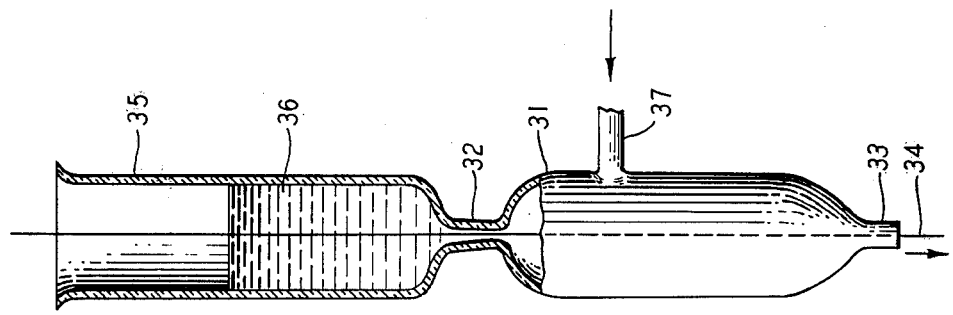
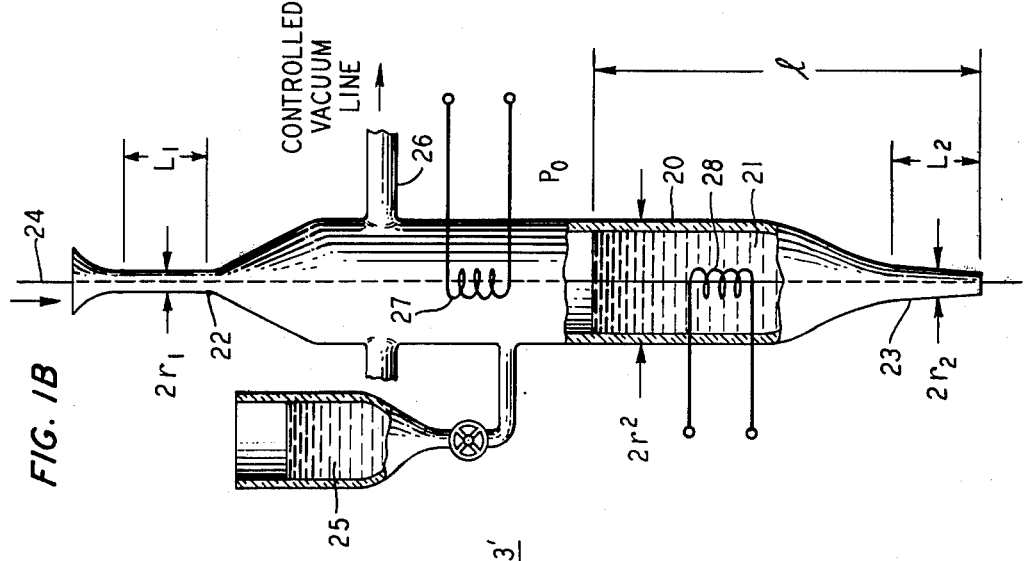
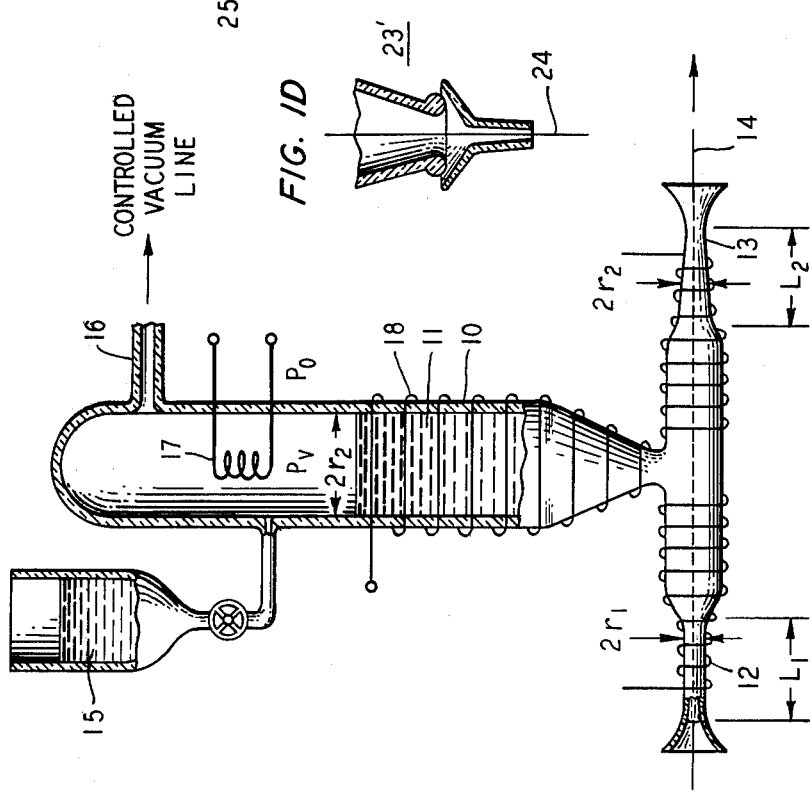

COATING CONTINUOUS FILAMENTS

BACKGROUND OF THE INVENTION

Glass fibers with very low optical transmission loss now can be made routinely. Attention has now shifted to those physical characteristics of the fibers that are important to a practical glass fiber cabling technology. D. Gloge reports in *The Bell System Technical Journal,* Vol. 54, No. 2, p245, that glass fibers are surprisingly susceptible to mechanical distortions caused by very small anisotropic forces. These distortions can lead to unacceptable optical losses. The kinds of forces implicated are unavoidable in normal cable processing and installation. Gloge has also shown that the distortions can be reduced by providing the fiber with a protective coating. He suggests some guidelines for the choice of the coating material, especially in the selection of the hardness of the coating. The assumption is made here that fibers used in commercial transmission equipment will have applied to them some form of protective coating. This assumption is widely made in the art.

The study by Gloge of mechanical deformation of fibers emphasizes the need for a coating process which avoids similar mechanical abuse during the coating process. We have found that coating processes, such as wick coating, that involve mechanical contact with the fiber introduce mechanical infirmities in the fiber. These may cause optical losses and may even lead to fiber breaks. It is evident that the uncoated glass fiber is even more susceptible to mechanical damage than the coated fibers studied by Gloge. It is desirable therefore to coat the fiber as soon as the fiber is formed, before it encounters any mechanical guides or reels. It is also desirable that the coating process itself be designed to avoid any physical touching of the fiber other than by the coating material itself.

This invention is a technique and corresponding apparatus for coating a continuous fiber in accordance with the objectives just outlined. It involves passing the continuous fiber through the coating material, typically a liquid that later cures, with the coating material contained in a specially designed container. The entrance and exit openings for the fiber are capillaries. At least one of the capillaries is located at the base of the container (in a gravitational sense) so that it is continuously exposed to the coating liquid. As the fiber is drawn through this capillary the fiber will tend to remain centered within the capillary, away from the potentially hazardous walls, through the action of fluid dynamics. In principle the combination resembles a fluid bearing. The other capillary opening may be disposed also below the fluid level, in which case it behaves similarly to that just described. In one form of the invention one capillary resides above the fluid level. The fiber is centered within this capillary by providing a flow of gas so that it acts as a gas bearing. For the purposes of this invention a gas bearing is one having a pressure differential between the interior and exterior of the capillary. See also e.g., U.S. Pat. No. 3,480,340 dated Nov. 25, 1969. The gas flow serves another important role in accordance with the invention which is to control the flow of fluid through an immersed capillary. The control is effected most conveniently by creating a negative pressure within the container although other arrangements in the same spirit will be described. This aspect of the invention becomes especially useful when the coating liquid is very fluid and would tend otherwise to flow freely through the immersed capillary. We have found that coatings become uneven due to dripping when the flow is uncontrolled. If the fiber travels upward through the capillary the flow of fluid through the capillary is reduced but the dripping problem remains, this time as the fiber leaves the free surface of the fluid.

It is evident that however the capillaries are arranged they will have a common axis.

DESCRIPTION OF THE PRIOR ART

Coating techniques for continuous members have been applied in many forms to sheets, strips, wire, etc. Passing the continuous member through a vacuum in conjunction with the coating process has been suggested usually for the purpose of removing air from the member to be coated. See, for example, U.S. Pat. Nos. 528,301 dated Oct. 30, 1894; 3,473,511 dated Oct. 21, 1969; 3,613,634 dated Oct. 19, 1971. U.S. Pat. No. 3,197,324 issued July 27, 1965 recognizes the possibility of using a vacuum to aid in preventing the escape of a coating material, here a powder, from a strip coating container. The possibility of utilizing the resultant air flow as the fluid in a fluid bearing apparently has been overlooked in prior processes. In most of the known work on coating continuous members the continuous member is typically very bulky compared with the fine glass fiber that is involved here. The conventional wire handling equipment used for processing wire, even very fine wire, is not useful for optical fibers, because of the inherent mechanical abuse.

BRIEF DESCRIPTION OF THE DRAWINGS

FIG. 1A is a schematic representation of a fiber coating apparatus designed for an in-line system in which the fiber is pulled horizontally;

FIG. 1B is a similar schematic representation for a vertical pulling apparatus;

FIG. 1C is an alternative vertical arrangement illustrating the use of positive pressures rather than negative pressures for controlling the fluid flow in the liquid immersed capillary;

FIG. 1D shows an alternative structure for the flooded capillary of FIG. 1B.

FIG. 7A — the axis of the fiber intersects the axis of the capillary, FIG. 7B — the axis of the fiber is parallel to the capillary axis but off center.

FIG. 1A illustrates an apparatus arranged to caot fibers that are pulled horizontally. The apparatus comprises a container 10 typically glass for containing the liquid coating material 11. The shape of the container is not important except that it terminates at a lower part in two in-line capillaries 12 and 13. Through these capillaries is threaded the glass fiber 14. Communicating with container 10 is a reservoir 15 arranged to maintain a head of coating liquid within the container. At the upper part of the container, above the normal fluid level, is an outlet 16 connected to a vacuum. This particular apparatus is provided with a condensing coil 17 and a heating coil 18. The former prevents excessive volatilizing of the coating liquid in case it is very volatile; the latter can be used to control the viscosity of the coating fluid and thereby affect the performance of the apparatus. Either of these is optionally used. This device is designed for fiber travel in the direction shown in that one or both of the capillaries is tapered. The capillaries are tapered for reasons that will become evident. Although this feature is shown it is not regarded as essential and the taper could be eliminated and the fiber travel could be reversed without difficulty. The illustration shows the capillary on the left to be partially empty which tends to happen due to friction between the liquid and the incoming fiber. The specific design of the apparatus will be treated in greater detail below. One arrangement found suitable employed an entrance capillary with a 5 mm ID and an exit capillary tapered from 1 to 0.6 mm over a length of 1 to 1.5 inches.

Figure 2:
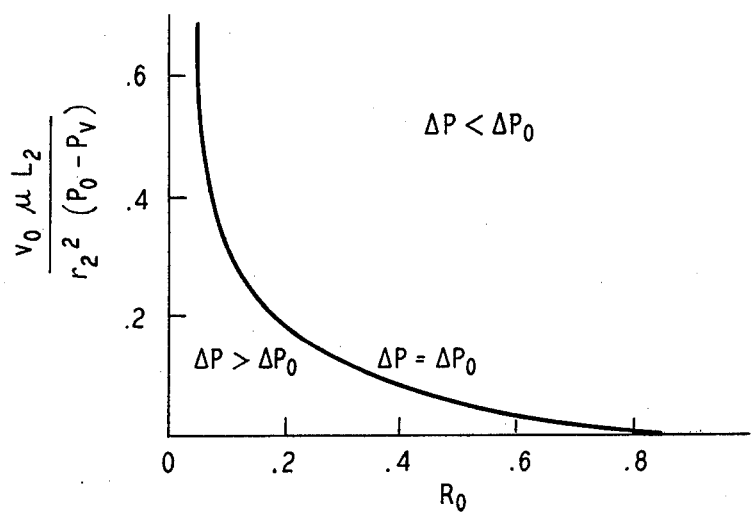
FIG. 2 is a plot of an equation describing the fluid flow in the exit capillary.

The embodiment shown in FIG. 1B is arranged to coat a vertically pulled fiber 24. The container 20 supports a head of the coating liquid 21. The two capillaries appear at 22 and 23. The reservoir 25, vacuum line 26, condensing coil 27 and heating coil 28 are arranged as shown and serve essentially as in FIG. 1A. This apparatus is designed with one fluid bearing 23 and one gas bearing 22. The gas flow is maintained by the vacuum within the chamber over the fluid level, and differs from the arrangement of FIG. 1A in that the vacuum is dynamically controlled. The fluid bearing may advantageously be made "floating" with respect to the container 20, as indicated in the cut-out with the bearing attached to the container with a swivel fitting here, a greased ball and socket 23' in FIG. 1D. This aids further in keeping the fiber centered within the capillary when the fiber axis drifts.

We have found that in many cases when this kind of apparatus is used the fiber is sufficiently self-centered that the physical control added by the air bearing is unnecessary. With coating liquids that are viscous the vacuum control can be eliminated at the same time, leaving an apparatus comprising just the lower half of the container of FIG. 1B, i.e., a flooded capillary that "floats" with respect to the container, as shown in FIG. 1D.

The arrangement of FIG. 1C illustrates the use of a positive pressure to control the fluid flow through the exit capillary. Here the pressurized container that is used to control the fluid flow through the exit capillary while at the same time providing an air bearing to aid in handling of the fiber is the pressure chamber 31. Gas inlet 37 maintains a positive pressure within the chamber 31. Liquid bearing 32 and gas bearing 33 correspond to the respective bearings in the apparatus of FIG. 1B except for the change in physical position, and the gas flow opposite to the direction the fiber 34 travels. The reservoir 35 maintains coating liquid 36 within the liquid immersed capillary 32 while the positive pressure controls the liquid flow. It may be desirable to use an elongated chamber 31 so that the coating is reasonably well cured prior to entering the turbulent region of the gas bearing 33. However, the degree of turbulence in this region with various processing conditions and the extent to which it might affect adversely a viscous or non-viscous coating are not known. The stability of the fiber as it transcends the liquid capillary 32 can be affected positively by positioning the gas bearing 33 near the capillary 32.

The various forms of the coating device all operate by controlling the pressure at the exit capillary to prevent an excess of coating liquid from being pulled along by the momentum of the fiber.

An analysis of the mechanism, and the relationships between the many design variables, follows. The analysis is organized in sections:

i. the fluid dynamics in the annular section of the device where the coating liquid flows between the fiber and the walls of the capillary, ii. the gas dynamics in the annular section of the device where the air flows into the device and has to be removed by the vacuum pump, iii. the fluid dynamics in the region where the fiber leaves the device through the liquid meniscus and where a combination of viscous and capillary forces determine the final thickness of the coating layer, iv. the effect of misalignment upon the hydrodynamic stresses acting on the fiber.

Consider the fluid flow generated by the motion of an infinitely long cylinder of radius which travels at a constant velocity $v_o$ with its axis on the axis of a surrounding cylinder of radius $r_2$ ($r_2 > a$) and length $L_2$ where $L_2 >> r_2$. The annular gap between the two cylinders is filled by a liquid of kinematic viscosity $\nu$ which is maintained in the gap by a pressure difference $(P_o - P_v) > o$ acting across the length $L_2$ of the outer cylinder so as to oppose the flow caused by the motion of the inner cylinder. To obtain an analytical solution of the Navier-Stokes equation for this case we make the following assumptions:

i. The inertia of the fluid is negligible when compared to the viscous stresses, i.e., the Reynolds number [Re $= v_o(r_2 - a)/\nu$] for the flow is small.

ii. The fluid velocity in the annular gap far from the extremes of the outer cylinder is parallel to the axis of the cylinders. Thus our calculations apply within the restriction: $L_2 >> (r_2 - a)$. Under these limitations the continuity equation is always satisfied and the Navier-Stokes equation reduces to:

$$\frac{1}{r} \frac{d}{dr}\left(r\frac{dv_z}{dr}\right) = \frac{1}{\mu} \frac{\partial P}{\partial z}; \frac{\partial P}{\partial r} = 0; \frac{\partial P}{\partial \omega} = 0, \quad (1)$$

where $v_z = v_z(r)$ is the z-component of the velocity field in the annular gap, $\mu$ is the viscosity of the fluid, P is the pressure and $r, \varphi, z$ are the cylindrical polar coordinates.

Let us use the dimensionless variables:

$$R = r/r_2; R_o = a/r_2; V_z = v_z/v_o; \Delta P = -\frac{1}{4\mu} \frac{r_2^2}{v_o} \frac{dP}{dz}. \quad (2)$$

Substituting Eq (2) into Eq (1) and integrating yields:

$$V_z = C_2 + C_1 \ln R + \Delta P\, R^2, \quad (3)$$

where $C_1$, $C_2$ are constants to be determined. The boundary conditions for $V_z$ are:

at $r = a$, $R = R_o, v_z = v_o, V_z = 1$; (4a)

at $r = r_2, R = 1: v_r = 0, V_z = 0.$ \hfill (4b)

From Eqs (3) and (4) one obtains:

$$V_z = -\Delta P(1-R^2) + [1 + \Delta P(1-R_o^2)] \frac{\ln R}{\ln R_o}. \quad (5)$$

To calculate the total flux $q$ of liquid through a cross-section of the annular gap one integrates Eq (5) over the cross-section and obtains:

$$Q = \frac{2q}{\pi v_o r_2^2} = (1-R_o^2)^2 \Delta P \left\{ \frac{R_o^2(1-2\ln R_o) - 1}{(1-R_o^2)\ln R_o} - 1 \right\} + \frac{R_o^2(1-2\ln R_o) - 1}{\ln R_o}. \quad (6)$$

when no other losses are present, the flux of the coating liquid $q$ has to equal the amount of liquid leaving the applicator as the coating around the fiber. If $h\infty$ is the average thickness of this coating layer, and $H\infty = h\infty/r_2$, then $$q = \pi v_o r_2^2 \{(R_o + H\infty)^2 - R_o^2\}. \quad (7)$$

Equations (6) and (7) relate $\Delta P$ to the geometry of the applicator, the velocity of the fiber, and the thickness of the coating layer $H\infty$. If the thickness of the coating layer is very small ($H\infty \to 0$), then from Eq (7) $q \to 0$ so that from Eq (6) one obtains a relationship between the limiting $\Delta P$, which we call $\Delta P_o$, and $R_o$:

$$\Delta P_o = \frac{R_o^2(1-2\ln R_o) - 1}{(1-R_o^2)[(1-R_o^2) + (1+R_o^2)\ln R_o]}, \quad (8)$$

where $\Delta P_o$ can be considered to represent the minimum value of $\Delta P$ required to maintain zero liquid flux through the annular gap. Equation (8) defines the two regions in the plane $\Delta P$, $R_o$ (FIG. 2):

i. For $\Delta P > \Delta P_o$ the coating liquid is made to flow in the direction opposite to the fiber motion. Practically, this means that air bubbles will enter the capillary at the point of the fiber exit.

ii. For $\Delta P < \Delta P_o$ some of the coating liquid follows the fiber as it goes through the applicator. FIG. 2B shows that when the diameter of the fiber approaches the diameter of the capillary ($R_o \to 1$), even for $P_v$ approaching zero (absolute vacuum), the motion of the fiber induces a liquid flux in the fiber direction no matter how slow the fiber velocity. Conversely, when the diameter of the fiber is much smaller than the diameter of the capillary ($R_o \to 0$), a low pressure difference ($P_o - P_v$) is sufficient to produce a liquid flux in the direction opposite to the fiber motion even at large fiber velocities. The velocity profiles for the cases $\Delta P = \Delta P_o$, $\Delta P > \Delta P_o$ and $\Delta P < \Delta P_o$, as calculated from Equation (5) where $R_o = 0.1$.

The equations derived in this section apply to both designs of the coating applicator. In the vertical applicator, however, the pressure difference ($P_o - P_v$) has to be higher because it has not only to counteract the momentum transferred to the coating fluid by the moving fiber, but also to support the column 1 of liquid (FIG. 1B).

Figure 4A:
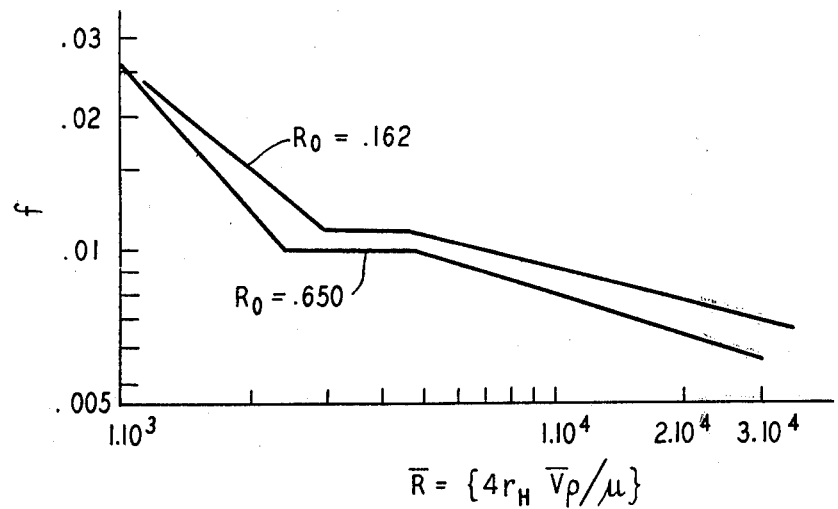
FIGS. 4A and 4B are plots relating the gas flow variables in the gas bearing when the flow is turbulent.
Figure 3:
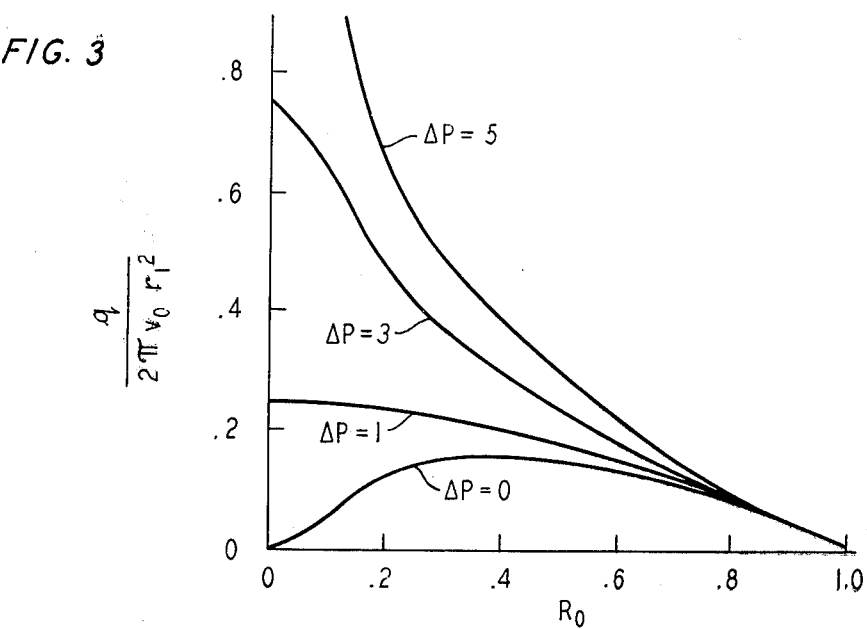
FIG. 3 is a plot of relationships describing the gas flow dynamics in the gas bearing, assuming laminar flow.

The flow of gas into the applicator through the capillary of radius $r_1$ and length $L_1$ is governed principally by the pressure difference ($P_o - P_v$) acting at the extremes of the capillary. The momentum transferred to the fluid by the motion of the fiber plays a role only at low pressure differences and gap widths because the viscosity of the gas is very small, about 2 orders of magnitude lower than the viscosity of a water-like liquid. We will therefore consider three flow regimes:

i. The laminar flow regime in which the gas flow may be considered that of an incompressible and viscous fluid. This regime sets in where the Reynolds number of the flow [$Re = \bar{v}(r_1 - a)/\nu$] is small and the capillary length $L_1$ is much greater than the gap width ($r_1 - a$), where $\bar{v}$ being the average velocity in the annular gap.

ii. The turbulent flow regime which, in long annular channels with $L_1 >> (r_1 - a)$, sets in at large Reynolds numbers and which is governed only by the pressure difference ($P_o - P_v$) outside a small boundary layer of thickness $\epsilon = \nu/v_o$ around the fiber.

iii. The flow around the orifices of the capillary of radius $r_1$.

i. In this case the total flux of air $q$ is given by Eq. (6), where the value of $\Delta P$ is now negative (the pressure difference favors the influx of air into the applicator) and the velocity profile is also that given by Eq. (5) [where now $R_o = a/r_1$]. It shows that the effect of the motion of the fiber is very small for large pressure differences and large gap widths but grows in importance as the pressure difference and the gap width decrease. FIG. 3 illustrates the relationship between the total flux of air $q$ and the geometry of the annular gap at different pressure differences. It shows that for large pressure differences the flux of gas is significant in large annular gaps ($R_o \to 0$) and tends to small values as the gap width is decreased ($R_o \to 1$), no matter the value of the pressure difference.

ii. At large values of the Reynolds number for the air flux, i.e., at large values of the pressure difference ($P_o - P_v$) and the gap width, the laminar viscous-flow approximation no longer describes the gas flow. In this case one neglects the effect of the momentum transferred to the gas by the moving fiber so that the problem reduces to that of a turbulent gas flow in a smooth annular gap. Rothfus, Monrad and Senecal have analyzed this problem experimentally; their conclusions can be summarized as follows:

i. The relationship between the pressure drop ($P_o - P_v$) and the average velocity $\bar{v}$ in the annular gap is given by:

$$\frac{P_o - P_v}{L_1} = f \frac{\rho \bar{v}^2}{r_1(1-R_o)} \quad (9)$$

where $f$ is the over-all fanning friction factor in the annulus. The friction factor $f$ is a function of the overall Reynolds number Re for the annulus:

$$Re = \frac{4 r_H \bar{v}}{\nu} \quad (10)$$

where $r_H$ is the hydraulic radius for the annulus [$= \frac{1}{2}(r_1 - a)$].

ii. The relationship between $f$ and Re was derived experimentally and is shown in FIG. 4A for two geometries: $a/r_1 = 0.162$ and $a/r_1 = 0.65$.

Figure 4B:
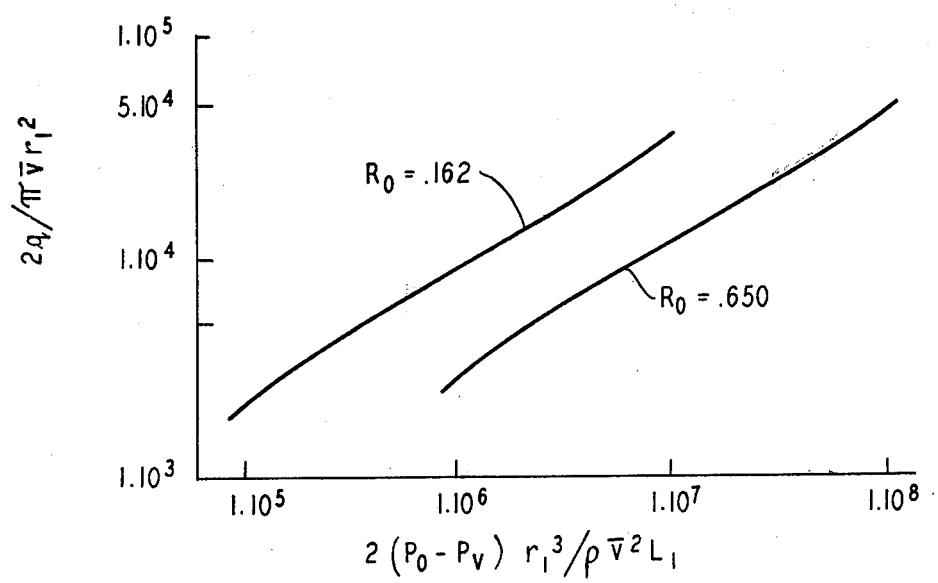

On the basis of this work one can calculate the relationship between the total flux $q$ through the annulus and the pressure gradient $(P_o - P_v)/L_1$ for various geometries of the capillary. FIG. 4B shows this relationship for $a/r_1 = 0.162$ and $a/r_1 = 0.65$. It shows that at a given pressure difference and capillary geometry, the setup with $a/r_1 = 0.65$ is characterized by an air flux $q$ which is approximately one order of magnitude lower than the air flux in the setup with $a/r_1 = 0.162$. Note that the order of magnitude of the factors of the abscissa of FIG. 4B is $1 \times 10^{-11}$ (dynes) for $\rho v_2$ of air at room temperature, $1 \times 10^{-1}$ (cm) for $r_1$, and $1 \times 10^0$ (cm) for $L_1$. Thus, if the order magnitude of the abscissa in FIG. 4B has to be between $1 \times 10^5$ and $1 \times 10^8$, the value of $(P_o - P_v)$ has to vary from $1 \times 10^4$ to $1 \times 10^{-1}$ dynes/cm for turbulent flow to develop. These values require a very high vacuum indeed and thus only under these extreme conditions should the graph of FIG. 4B be used to determine $q$. For more usual operating conditions, i.e., $(P_o - P_v)$ of the order of magnitude of $1 \times 10^2$ dynes/cm, the laminar viscous-flow calculations apply.

iii. Taking the capillary of radius $r_1$ and length $L_1$ through which air enters the applicator, let us consider the case $L_1 \rightarrow 0$, i.e., the case in which instead of a capillary the applicator has an orifice of radius $r_1$. Then the total flux of air into the applicator is given by:

$$q = \pi r_1^2 (1 - R_0^2) X_1 X_2 X_3 \sqrt{2\rho (P_o - P_v)} \quad (11)$$

where $X_1$ is the expansion factor which takes into account the compressibility of the fluid, $X_2$ the velocity-of-approach factor which takes into account the finite flow area upstream from the orifice and $X_3$ is the coefficient of discharge which corrects for nonuniform velocity profiles, friction and jet contraction. These three coefficients $X_1$, $X_2$, $X_3$ have to be determined experimentally. For low pressure differences and circular orifices $X_1 \simeq 0.9$, $X_2 \simeq 1$ and $X_3 \simeq 0.6$. This shows that if $r_1$ is fairly small and $(P_o - P_v)$ is also small, one can replace the capillary of length $L_1$ and radius $r_1$ with an orifice of radius $r_2$ without requiring the vacuum pump to remove a large amount of gas ($q$ is small).

Figure 5A:
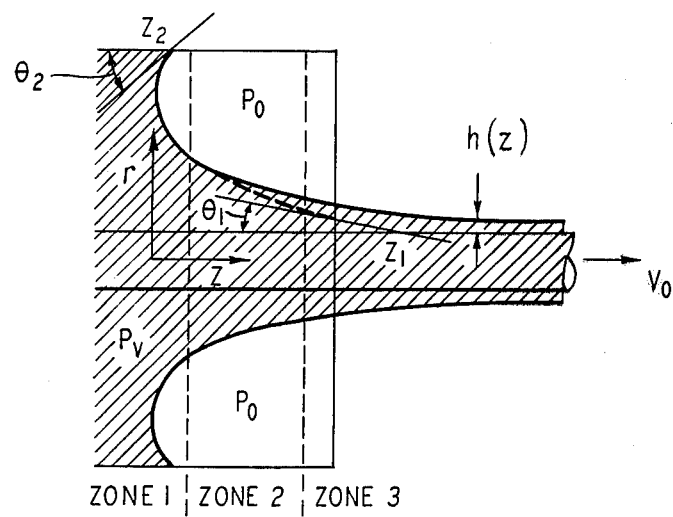
FIG. 5A is a schematic representation of the dynamic meniscus profile at the exit of the immersed capillary.

We consider now the extreme region of the capillary of radius $r_2$ and length $L_2$ (FIG. 1), i.e., the region in which the cylindrical fiber leaves the coating applicator and carries on its surface a coating layer of thickness $h(z)$ (FIG. 5A). The problem is how to relate the thickness $h$ to the geometry of the applicator, to the radius $a$ and velocity $v_o$ of the fiber, to the viscosity $\mu$, density $\rho$, and the surface tension $\gamma$ of the coating liquid and to the effect of gravitational forces. From an examination of FIG. 1 it becomes obvious that the gravitational forces play different roles in the horizontal and vertical applicators. In the horizontal applicator the gravitational forces act perpendicularly to the fiber axis and tend to disturb the axial symmetry of the liquid meniscus and the coating layer. In the vertical applicator, the gravitational forces are parallel to the fiber axis and contribute to the flow of the liquid onto the fiber itself. To evalute the contributions of the gravitational forces to the mechanics of the problem, we consider the ratio between the gravitational forces and the capillary forces. This ratio, also called the Goucher number $N_{Go}$, is given by:

$$N_{Go} = \sqrt{\frac{\rho g r^2}{2\gamma}} \quad (12)$$

where $g$ is the gravitational acceleration and $r$ the characteristic length of the system under scrutiny. In the coating of hair-thin optical fibers, where $a < 2.5 \; 10^{-2}$ (cm) and $r_2 \; 10^{-1}$ (cm) and where $\gamma$ is taken to be of the order of 20 (dynes/cm) and $\rho \simeq 1$ (gram cm$^{-3}$) as for most organic coatings, the corresponding Goucher number is smaller than one, varying from 0.12 to 0.5. This suggests that especially in zone 3 of FIG. 5A, the gravitational forces are about one order of magnitude lower than the surface tension forces and hence we neglect them in this analysis.

Following the classic analysis of the withdrawal of an infinitely large plate from a liquid surface by Landau and Levich and using the cylindrical polar coordinates $r, \varphi, z$ (FIG. 5A) one writes the equations governing the axis-symmetric steady-state flow of a thin layer of a Newtonian and incompressible fluid as follows:

Equation of continuity: $\nabla \cdot \underline{v} = 0$ \hfill (13)

Equation of Motion: $(\nabla \cdot \underline{v}) \underline{v} = -(1/\rho) \nabla P + \nu \nabla^2 \underline{v}$ \hfill (14)

Capillary Equation:

$$P_o - P = J\gamma = \frac{1}{r} \frac{d}{dr} \frac{r(dz/dr)}{\sqrt{1 + (dz/dr)^2}} \quad (15)$$

where $\underline{v}$ is the velocity vector, P the hydrostatic pressure in the fluid, $P_o$ the constant pressure of the ambient, J the total curvature of the liquid/gas interface and $\nabla$ and $\nabla^2$ the gradient and Laplacian operators respectively. While the equations of continuity and of motion have to be satisfied in the bulk of the liquid coating and at the interfaces liquid/air and liquid/solid, the equation of capillarity has to be satisfied only at the interfaces liquid/air and liquid/solid. The simultaneous solution of Eqs. (13) to (15) subjected to the proper boundary conditions allows the determination of the coating thickness on the fiber as it exits from the applicator.

To simplify the solution of Eqs. (13) to (15), following the procedure of Landau and Levich, one divides the meniscus region into three zones. In the first zone (zone 1 in FIG. 5A) the shape of the meniscus is that of a static meniscus, i.e., as if the fiber velocity $v_o$ were zero. In the third zone (zone 3 in FIG. 5A) the liquid is completely entrained by the motion of the fiber into a cylindrical coating. In the second zone the two solutions for zone 1 and zone 3 have to be matched. We know that a cylindrical liquid coating is unstable and becomes varicose under the effect of the interfacial surface tension of the liquid. The rate of growth of the varicosity is proportional to $[\gamma / \mu(a + h)]$. In the present study we will consider only the length $L_3$ of zone 3 where varicosity has not yet grown substantially, i.e.:

$$\frac{L_3}{a + h} < \frac{v_o \mu}{\gamma} \quad (16)$$

Equation (16) applies for coating layers thicker than a monolayer. When the fiber is coated by a monolayer of liquid, the break-up of this layer occurs only if the conditions for de-engulfing are satisfied.

Since we have neglected the effect of gravity, the solutions of Eqs. (13) to (15) apply to both the horizontal and vertical applicator.

We have assumed zero gravitational effects, hence the shape of the meniscus is symmetric with respect to the $z$ — axis (FIG. 5A). With $R = r/r_2$, $R_o = a/r_2$, $Z = z/a$ and $\Delta P_c = r_2(P_o - P)/\gamma$, Eq. (15) reduces to:

$$\Delta P_c = \frac{1}{R} \frac{d}{dR} \frac{R(dz/dR)}{\sqrt{1 + (dz/dR)^2}} \quad (17)$$

which integrated with the boundary conditions:

$$R = R_o, dz/dR = -\cotg \theta_1; \quad (18a)$$

$$R = 1\ dz/dR = \cotg \theta_2, \quad (18b)$$

where $\theta_1$ and $\theta_2$ are the contact angles at the fluid/fiber and fluid/tube respectively, gives:

$$\frac{R(dz/dR)}{\sqrt{1 + (dz/dR)^2}} = \quad (19a)$$
$$\frac{\cos \theta_2 + R_o \cos \theta_1}{1 - R_o^2}(R^2 - R_o^2) - R_o \cos \theta_1.$$

From Eq (19a) one can derive the value $\overline{R}$ of $R$ where $dz/dR = 0$:

$$\overline{R} = \sqrt{R_o \frac{\cos \theta_1 + R_o \cos \theta_2}{R_o \cos \theta_1 + \cos \theta_2}} \quad (19b)$$

Figure 5B:
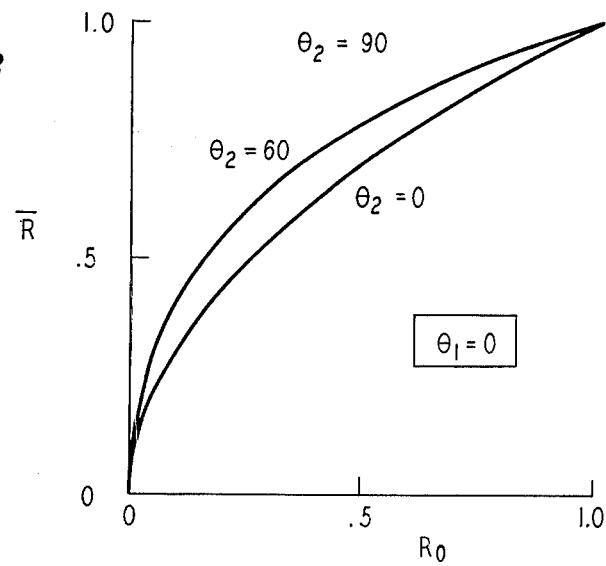
FIG. 5B is a plot of certain variables defining the contact angle $\theta$ between the coating liquid and the capillary wall.

FIG. 5B illustrates Eq (19b) for $\theta_1 = 0$ and various $\theta_2$. For $\theta_2 > \pi/2$, $dz/dR \neq 0$ and the meniscus shows an inflection point.

Equation (19a) can be integrated further to give the meniscus shape $Z = Z(R)$. For the simplest cases $\theta_1 = 0$, $\theta_2 = 0$ and $\theta_1 = 0$, $\theta_2 = \pi$ the integral of (19a) becomes respectively:

$$\begin{cases} Z_2 - Z = E(\lambda, m) - R_o F(\lambda, m)\ (\theta_1 = 0, \theta_2 = 0); & (20a) \\ Z - Z_2 = E(\lambda, m) + R_o F(\lambda, m)\ (\theta_1 = 0, \theta_2 = \pi), & (20b) \end{cases}$$

where:

$$\lambda = \arcsin \sqrt{\frac{1 - R^2}{1 - R_o^2}}\ ;\ m = \sqrt{1 - R_o^2}, \quad (20c)$$

$Z_2$ is the value of $Z$ at $R = 1$ and $F(\lambda,m)$ and $E(\lambda,m)$ are the complete elliptical integrals of the first and second kind respectively.

From Eqs. (17) and (19a) one can calculate the total dimensionless curvature of the static meniscus:

$$J_{stat} = 2 \frac{\cos \theta_2 + R_o \cos \theta_1}{1 - R_o^2}. \quad (21)$$

Equation (21) shows that for $R_o \rightarrow 0$, $J_{stat} \rightarrow 2 \cos \theta_2$, which is the curvature of the meniscus of a liquid contained in a tube at the surface of which the contact angle is $\theta_2$. We will use $J_{stat}$ to be the curvature of the meniscus in the static region (zone 1 in FIG. 5A).

Besides the assumption of zero gravitational effects we also assume that;

i. The total dynamic curvature J of the liquid interface is evaluated by assuming that $d(H + R_o)/dZ$ is small compared to the thickness $(H + R_o)$ of the liquid coating (FIG. 5A), thus:

$$J \simeq r_2^{-1}\left(\frac{-1}{H + R_o} + \frac{d^2H}{dZ^2}\right) \quad (22)$$

ii. The liquid wets the fiber surface, i.e., $\theta_1 = 0$.

iii. In the liquid film the axial component $v_z$ of the velocity is much larger than the radial component $v_r$.

iv. The inertia effects are negligible, i.e., the Reynolds number of the flow is small.

v. The hydrostatic pressure in the liquid film is equal to the capillary pressure at the liquid/gas interface, thus:

$$-\frac{dp}{dx} = \frac{d}{dx} \gamma J. \quad (23)$$

Under these limitations which also characterized the Landau and Levich analysis, Eq. (16) becomes:

$$\beta \frac{d}{dz}\left(\frac{d^2H}{dz^2} - \frac{1}{R_o + H}\right) + \frac{1}{R} \frac{d}{dR} R \frac{dV}{dR} = 0, \quad (24)$$

where $\beta$ is a dimensionless number given by:

$$\beta = \gamma/\mu v_o \quad (25)$$

Integrating Eq. (24) with the boundary conditions at the liquid/gas interface:

$$R = R_0 + H,\ dv_z/dR = 0\ ; \quad (26a)$$

$$R = R_o V_z = 1, \quad (26b)$$

one obtains:

$$V_z = 1 - \frac{1}{2}\beta \left\{ (R_o + H)^2 \ln \frac{R_o}{R} + \right. \quad (27)$$
$$\left. \frac{1}{2}(R^2 - R_o^2)\right\} \frac{d}{dZ}\left(\frac{d^2H}{dZ^2} - \frac{1}{R_o + H}\right).$$

The rate of liquid consumption $q$ is thus given by:

$$q = 2\pi r_2^2 v_o \int_{R_o}^{R_o + H} V_z R\ dR. \quad (28)$$

Substituting Eq. (27) into Eq. (28) and integrating yields:

$$Q = 4H(H + 2R_o) - \frac{\beta}{2}\left\{4(H+R_o)^4 \ln \frac{H+R_o}{R_o} - \right. \quad (29)$$
$$2H^3 - 8HR_o(H+R_o) +$$
$$\left. 2R_o(1 + 2R_o^2)\right\}\frac{d}{dz}\left(\frac{d^2H}{dz^2} - \frac{1}{H + R_o}\right)$$

where $$Q = \frac{4q}{\pi v_o r_2^2}. \quad (30)$$

Equation 29 determines the film thickness $H(z)$ in terms of the given quantities: $v_o$, $r_2$, $a$, $\gamma$, $\mu$. It is a third-order differential equation which upon integration gives $H(z)$ in terms of three integration constants and Q which is unknown. To determine these three constants and Q we need four boundary conditions. Again following the Landau and Levich analysis we write the four boundary conditions as:

i. The coating thickness is constant at infinity:

$$z \to \infty \quad H \to H_\infty \tag{31a}$$

$$z \to \infty \quad dH/dz = 0 \tag{31b}$$

$$z \longrightarrow \infty \quad \frac{d^2H}{dz^2} - \frac{1}{R_o + H} \longrightarrow -\frac{1}{R_o + H_\infty} \tag{31c}$$

ii. For large values of H and hence low values of z the total curvature of the liquid coating matches the total curvature of the static meniscus:

$$\lim_{H \longrightarrow \infty} \left( \frac{d^2H}{dz^2} - \frac{1}{R_o + H} \right) = J_{stat} \tag{31d}$$

The exact solution of Eq (29) subjected to the boundary conditions of Eqs (31) will be discussed in a later paper. Here we will discuss only the limiting case for which:

$$\left| \frac{d^2H}{dz^2} \right| >> \frac{1}{R_o + H}, \tag{32}$$

i.e., the two-dimensional case. In this case Eq (29) reduces to:

$$Q = \frac{q}{v_o r_2} = H + \frac{1}{3} \beta H^3 \frac{d^3H}{dz^3}. \tag{33}$$

Letting:

$$\mu = (3/\beta)^{1/2} Z Q^{-1} \text{ and } \Gamma = H/Q, \tag{34}$$

Equation (33) becomes:

$$\frac{d^3\Gamma}{d\lambda^3} = \frac{1 - \Gamma}{\Gamma^3} \tag{35}$$

Equation (35) was solved numerically by Landau and Levich who calculated that:

$$\lim_{\Gamma \longrightarrow \infty} \frac{d^2\Gamma}{d\lambda^2} = 0.63 \tag{36}$$

From Eqs (31), (34) and (36) and since from Eq (33) Q = H $_\infty$ $$H_\infty = 2.08 \frac{1 - R_o}{\cos \Theta_2 + 1} \beta^{-\frac{2}{3}} \tag{37}$$

Figure 6:
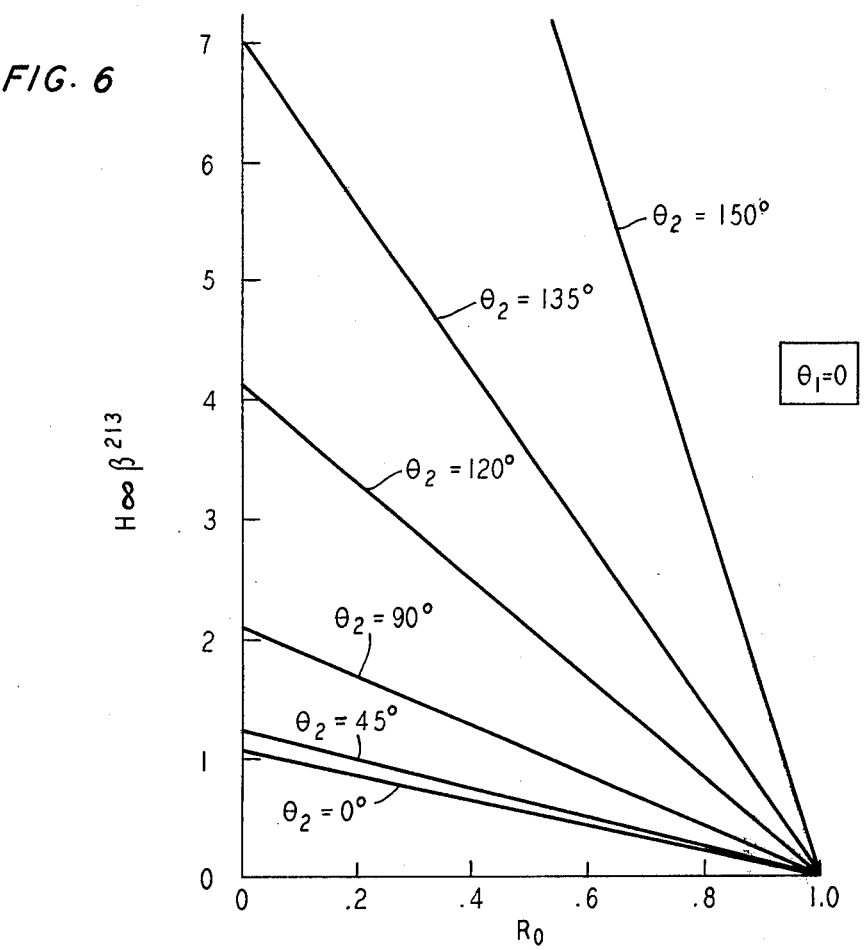
FIG. 6 is a plot of certain variables defining the effect of the contact angle of the meniscus on the coating thickness.

Equation (37) shows that the limiting thickness is directly proportional to the gap width ($r_2 - a$), to the withdrawal velocity $v_o$ and fluid viscosity $\mu$ to the $\frac{2}{3}$ power, but is inversely proportional to the interfacial surface tension $\gamma$ of the fluid to the $\frac{2}{3}$ power. The constant of this proportionality depends upon the contact angle $\theta_2$ at the solid/liquid interfaces at the outer capillary in the way illustrated in FIG. 6. FIG. 6 shows that, for a fluid which wets the fiber ($\theta_1 = 0$), the value of the contact angle $\theta_2$ significantly affects the limiting thickness of the coating, $H_\infty$ increasing rapidly with $\theta_2$ at a given $R_0$. Equation (37) applies only when $h_\infty >> (r_2 - a)$. This requires that $\beta >> 1$. For low viscosity silane coatings ($\mu \sim 10^2$ poises) $\beta >> 1$ requires $v_0 << 20$ (meters/sec.) and hence it is not a too restrictive condition. However, for viscous coatings ($\mu \sim 10$ poises) the condition $\beta >> 1$ is satisfied by $v_0 << 2$ (meters/min.) which is a very restrictive condition for an industrial operation. For viscous coatings and high velocities the coating thickness does not differ much from the gap width and Eq. (37) should be replaced by $H_{2s} = X_3(1 - R_0)$ where $X_3$ is the coefficient of discharge (to be determined experimentally) which corrects for the contraction ($X_3 < 1$) or expansion ($X_3 > 1$) of the annular fluid jet.

The hydrodynamic stresses acting on the fiber surface as the fiber travels through the applicator, and the uniformity of the final coating layer depend to a large degree upon the proper alignment of the fiber with the axis of the outer capillary tubes. For a perfectly aligned fiber, i.e., when the fiber axis coincides with the axis of the capillary tube, the hydrodynamic stresses have only axial components and thus their effect is not harmful because they only increase the tension along the fiber axis. When misalignment occurs, the distribution of the hydrodynamic pressures and stresses is no longer symmetric about the fiber axis and hence microbending of the fiber takes place. The purpose of this section is to calculate the order of magnitude of the hydrodynamic stresses caused by misalignments by deriving their dependence upon the parameters characterizing the geometry of the applicator, the properties of the coating fluid, the velocity and radius of the fiber and the degree of misalignment. These calculations are intended to provide a guide to counteract the effects of misalignment. To simplify the calculations, we will not treat the complicated flow between two noncoaxial cylinders, but we will limit ourselves to the two-dimensional problem and small misalignments. We believe that this analysis which applies strictly speaking only to small gap widths ($r_2 - a$) $<< r_2$ gives basic relationships which hold also for large gaps. Furthermore, we will assume that the bending of the fiber under hydrodynamic moments can be neglected and that the pressure difference ($P_o - P_v$) between the two extremities is also small when compared with $P_o$.

Figure 7A:
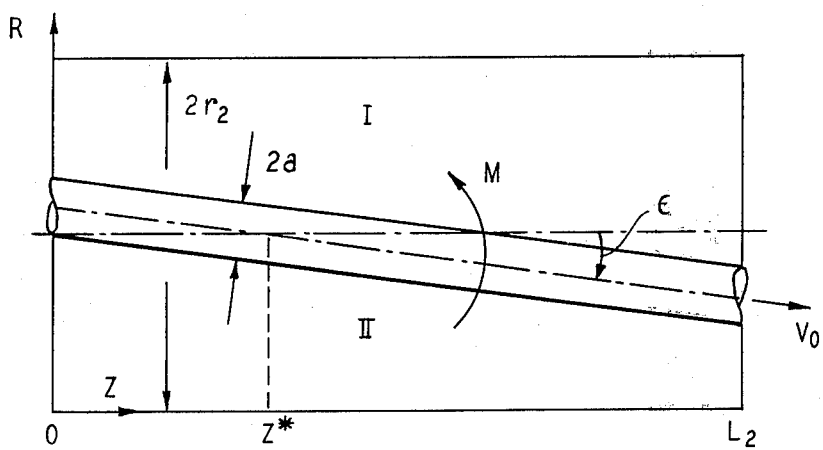
FIGS. 7A and 7B are schematic representations of two possible forms of misalignment of the fiber within the capillary.

1. FIG. 7A illustrates the case where with $\epsilon$ being the angle between the two axes and $z^*$ being the position of the intersection point. The solution of the 2-dimensional fluid flow yields the following pressure distribution in the two regions I and II of FIG. 7A:

$$P_\infty^I - P_o = 6\mu \, V_o L_2^2 \frac{\epsilon (1 - \xi) \xi}{[2(r_2 - a) - \epsilon (2z^* - L_2)] [(r_2 - a) + \epsilon (L_2 - z^* - L_2\xi)]^2} \tag{38}$$

$$P_\infty^{II} - P_o = 6\mu \, V_o L_2^2 \frac{\epsilon (1 - \xi) \xi}{[2(r_2 - a) + \epsilon (2z^* - L_2)] [(r_2 - a) + \epsilon (z^* - L_2\xi)]^2} \tag{39}$$

where $\xi = z/L_2$, $P_\infty{}^I$ and $P_\infty{}^{II}$ are the pressures in region I and II of FIG. 7A respectively. We have taken $\epsilon$ to be small so that $\sin \epsilon \simeq \epsilon$.

Inspection of Eqs (38) and (39) reveals that the pressure distribution in the capillary tends to align the fiber so that $z^* \rightarrow L_2/2$ and $\epsilon \rightarrow 0$. By integrating Eqs (38) and (39) on the fiber surface one can calculate the moment M acting on the segment of fiber between $0 \leqq z \leqq L_2$. For small values of $\epsilon$, M is given by:

$$M \simeq \mu V_o a \frac{L_2^5}{(r_2 - a)^4} \epsilon^2. \quad (40)$$

Eq (40) shows that M increases very rapidly with an increase in the length $L_2$ of the capillary and a decrease in the gap width $(r_2 - a)$. Thus, if good alignment cannot be achieved, one has to reduce the length $L_2$ of the capillary and increase the gap width $(r_2 - a)$ in order to keep bending of the fiber to a minimum.

Figure 7B:
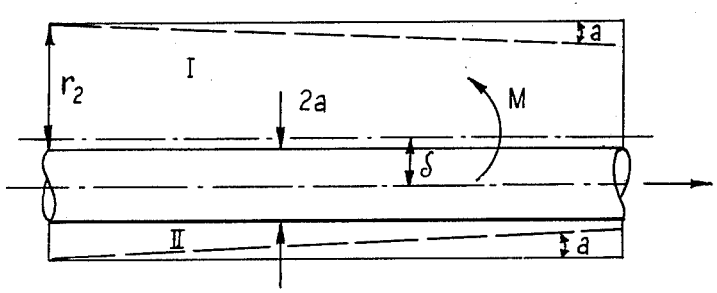

2. FIG. 7B illustrates the case where the axis of the fiber is parallel to the axis of the capillary but off center with $\delta$ being the distance between the two parallel axis. In the two-dimensional case the laminar flow in the two regions does not generate aligning pressures. This means that this kind of misalignment does not create microbending of the fiber. The resulting coating layer, however, will not be symmetric about the fiber axis. To avoid this we propose to taper the walls of the outer capillary at an angle $\alpha$ (FIG. 7B, dotted lines) so that the latter is no longer a cylinder of radius $r_2$ but a segment of a hollow cone. In this case the pressure $P_\infty{}^{II}$ in region II for small values of $\alpha$ ($\sin \alpha \simeq \alpha$) is given by:

$$P_\infty^{II} - P_0 = 3\mu V_o L_2^2 (1 - \xi)\xi \frac{\alpha}{[r_2 - a - \delta]^3}, \quad (41)$$

whereas for region I the pressure $P_\infty{}^I$ is given by:

$$P_\infty^I - P_o = 3\mu V_o L_2^2 (1 - \xi)\xi \frac{\alpha}{[r_2 - a + \delta]^3}. \quad (42)$$

From Eqs (41) and (42) one obtains:

$$P_\infty^{II} - P_\infty^I = 6\mu V_o L_2^2 (1 - \xi)\xi \alpha \frac{3(r_2 - a)^2 \delta + 2\delta^3}{[(r_2 - a)^2 - \delta^2]^3} \quad (43)$$

which shows that $P_\infty{}^{II} > P_\infty{}^I$, the difference increasing to $\infty$ as $\delta$ increases to $(r_2 - a)$. This proves that only large forces will cause the fiber to break the lubricating film of the coating liquid and to touch the wall of the capillary. The total forces $F^I$ and $F^{II}$ acting on the length $L_2$ of the fiber are given by:

$$F^I = \int_O^{L_2} (P_\infty^I - P_o) dz = \mu v_o L_2^3 \frac{\alpha a}{[r_2 - a + \delta]^3} \quad (44a)$$

$$F^{II} = \int_O^{L_2} (P_\infty^{II} - P_o) dz = \mu v_o L_2^3 \frac{\alpha a}{[r_2 - a - \delta]^3} \quad (44b)$$

From Eqs (41) to (44) the total moment M acting on the fiber in the direction indicated in FIG. 7B is given by:

$$M \simeq \frac{3}{2} \mu v_o L_2^5 a \frac{\alpha \delta}{(r_2 - a)^4} \quad (45)$$

Equation (45) allows us to calculate $\alpha$ so as to avoid bending damage of the film while providing enough pressure distribution to bring the axis of the fiber as close as possible to the axis of the capillary tube.

Although a large variety of possible conditions and equipment designs under which this invention may be practiced will be evident to those skilled in the art from the foregoing discussion we detail here a specific embodiment that was found to yield outstanding results.

The apparatus used was essentially the design appearing in FIG. 1B. The entrance capillary 22 was 3–4 mm and the exit capillary 23 was tapered from 1.5 mm to approximately 1.0 mm over a length of 25 mm. The fiber diameters in the range of 4–6 mils in diameter were coated effectively, at rates of 15 m/min and 25 m/min. Coating thicknesses depend on the coating liquid as well as the dimensions just prescribed. The following silane coating liquids were applied:

Hexamethylcyclotrisilazane (HMCTS)

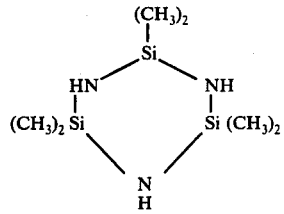

Octadecyltriethoxysilane (ODTES)

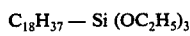

The silane coatings were thermally cured. The coated fibers were tested for tensile strength using 24-inches-long samples. The results are:

| | TENSILE STRENGTH | |
|---|---|---|
| | Time Elapsed Between Curing and Testing | |
| Coating Compound | 1 Day | 5 Days |
| HMCTS | 117 Kpsi | 130 Kpsi |
| ODTES | 181 Kpsi | 187 Kpsi |
| BARE FIBER | 94 Kpsi | 65 Kpsi |

These coating compositions are typically nonviscous so the use of the static pressure to control liquid flow through the flooded capillary is essentially advantageous.

This technique was also applied successfully to various organic coatings with different viscosities, thermally and U.V. cured.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. A method for coating a continuous fiber comprising:
   passing the fiber into and out of a fluid filled container through upper and lower constricted openings with the fluid level of the coating within the container maintained between the upper and lower openings, while maintaining a reduced pressure within the container by evacuating the space above the coating fluid, the lower constricted opening restricting the flow of coating fluid from the container and the upper constricted opening allowing entry of the continuous fiber into the container while combining with the fiber to produce a partial pressure seal.

2. The method of claim 1 in which the reduced pressure is of a value sufficient to reduce the normal flow of coating fluid through the lower constricted opening.

3. The method of claim 1 in which the upper constricted opening serves as a gas bearing to position the fiber in the center of the opening.

4. The method of claim 1 in which the coating fluid comprises an organic polymer.

5. The method of claim 1 in which the coating fluid is a silane compound.

6. A method for coating a continuous fiber comprising:

passing the fiber in a vertical downward direction sequentially through a first container, through a constriction joining the first container with a second container, through the second container, and through a constricted opening in the second container, while maintaining a positive pressure within the second container and coating fluid within the first container, the positive pressure combining with the constriction between the containers and the fiber to restrict the flow of coating fluid between the containers and the constricted opening in the second container combining with the fiber to produce a partial pressure seal in the second container.

7. The method of claim 6 in which the constricted opening in the second container serves as a gas bearing to position the fiber in the center of the opening.

8. The method of claim 6 in which the positive pressure is sufficient to reduce the flow of coating fluid from the first container to the second container.

* * * * *